(12) United States Patent
Huang et al.

(10) Patent No.: US 10,986,594 B2
(45) Date of Patent: *Apr. 20, 2021

(54) TRANSMISSION OPPORTUNITY DURATION FIELD IN HIGH EFFICIENCY SIGNAL FIELD

(71) Applicant: Intel IP Corporation, Santa Clara, CA (US)

(72) Inventors: Po-Kai Huang, San Jose, CA (US); Robert J. Stacey, Portland, OR (US); Qinghua Li, San Ramon, CA (US)

(73) Assignee: Intel IP Corporation, Santa Clara, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 16/178,168

(22) Filed: Nov. 1, 2018

(65) Prior Publication Data

US 2019/0208484 A1   Jul. 4, 2019

Related U.S. Application Data

(63) Continuation of application No. 15/279,907, filed on Sep. 29, 2016, now Pat. No. 10,178,634.

(Continued)

(51) Int. Cl.
*H04W 56/00* (2009.01)
*H04W 74/00* (2009.01)
(Continued)

(52) U.S. Cl.
CPC ..... *H04W 56/0005* (2013.01); *H04W 74/006* (2013.01); *H04B 7/0452* (2013.01);
(Continued)

(58) Field of Classification Search
CPC . H04B 7/0452; H04L 27/2601; H04L 69/323; H04W 56/0005; H04W 72/1289;
(Continued)

(56) References Cited

U.S. PATENT DOCUMENTS

| 10,178,634 B2 | 1/2019 | Huang et al. |
| 2011/0222408 A1 | 9/2011 | Kasslin et al. |

(Continued)

OTHER PUBLICATIONS

"U.S. Appl. No. 15/279,907, Corrected Notice of Allowability dated Sep. 19, 2018", 10 pgs.

(Continued)

*Primary Examiner* — Luat Phung
*Assistant Examiner* — Zhaohui Yang
(74) *Attorney, Agent, or Firm* — Schwegman Lundberg & Woessner, P.A.

(57) ABSTRACT

Methods, computer readable media, and wireless apparatuses are disclosed for a TXOP duration field. An apparatus is disclosed comprising processing circuitry configured to: encode a first high efficiency (HE) physical-layer convergence procedure (PLCP) protocol data unit (PPDU) comprising a transmission opportunity (TXOP) duration field in a first physical-layer portion of the first HE PPDU. The processing circuitry may be further configured to set the TXOP duration field value to indicate a largest duration value representable by the TXOP duration field that is equal to or less than a duration value indicated by the first MAC duration field, if the first HE PPDU is to include a first media access control (MAC) duration field in a first MAC-layer portion of the first HE PPUU.

19 Claims, 8 Drawing Sheets

Related U.S. Application Data

(60) Provisional application No. 62/278,010, filed on Jan. 13, 2016, provisional application No. 62/287,269, filed on Jan. 26, 2016.

(51) Int. Cl.
    *H04L 29/08*     (2006.01)
    *H04W 84/12*     (2009.01)
    *H04L 27/26*     (2006.01)
    *H04B 7/0452*     (2017.01)
    *H04W 72/12*     (2009.01)
    *H04W 74/08*     (2009.01)

(52) U.S. Cl.
    CPC ........ *H04L 27/2601* (2013.01); *H04L 69/323* (2013.01); *H04W 72/1289* (2013.01); *H04W 74/0808* (2013.01); *H04W 84/12* (2013.01)

(58) Field of Classification Search
    CPC ........... H04W 74/006; H04W 74/0808; H04W 84/12
    See application file for complete search history.

(56) References Cited

U.S. PATENT DOCUMENTS

| | | | |
|---|---|---|---|
| 2015/0382216 A1* | 12/2015 | Tian | H04W 24/08 370/252 |
| 2016/0315681 A1* | 10/2016 | Moon | H04B 7/0621 |
| 2016/0330764 A1* | 11/2016 | Kim | H04W 74/02 |
| 2017/0006608 A1* | 1/2017 | Josiam | H04L 5/00 |
| 2017/0171878 A1* | 6/2017 | Chun | H04L 27/26 |
| 2017/0201956 A1 | 7/2017 | Huang et al. | |
| 2017/0295560 A1* | 10/2017 | Kim | H04W 72/02 |

OTHER PUBLICATIONS

"U.S. Appl. No. 15/279,907, Examiner Interview Summary dated May 17, 2018", 3 pgs.
"U.S. Appl. No. 15/279,907, Non Final Office Action dated Feb. 26, 2018", 20 pgs.
"U.S. Appl. No. 15/279,907, Notice of Allowance dated Aug. 28, 2018", 14 pgs.
"U.S. Appl. No. 15/279,907, Response Filed May 9, 2018 to Non Final Office Action dated Feb. 26, 2018", 10 pgs.

\* cited by examiner ions set forth in the claims encompass all available equivalents of those claims.

TRANSMISSION OPPORTUNITY DURATION FIELD IN HIGH EFFICIENCY SIGNAL FIELD

PRIORITY CLAIM

This application is a continuation of U.S. patent application Ser. No. 15/279,907, filed Sep. 29, 2016, now issued as U.S. patent Ser. No. 15/279,907, which claims the benefit of priority under 35 USC 119(e) to U.S. Provisional Patent Application Ser. No. 62/287,269, filed Jan. 26, 2016, and U.S. Provisional Patent Application Ser. No. 62/278,010, filed Jan. 13, 2016, all of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for transmission opportunity (TXOP) duration field in high efficiency (HE) signal field.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
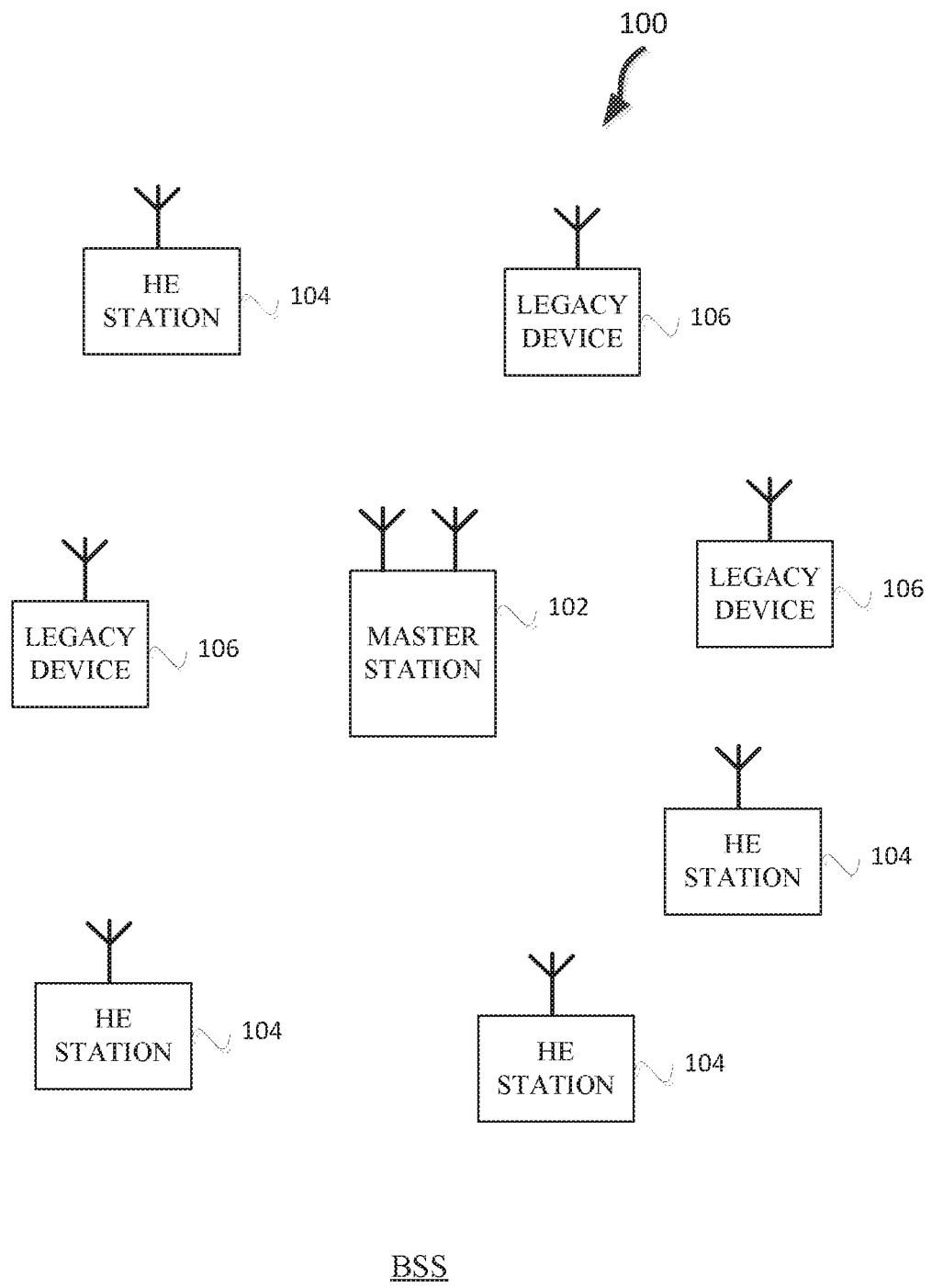
FIG. 1 illustrates a WLAN in accordance with some embodiments.

FIG. 1 illustrates a WLAN 100 in accordance with some embodiments. The WLAN 100 may comprise a basis service set (BSS) 100 that may include a master station 102, which may be an AP, a plurality of high-efficiency wireless (e.g., IEEE 802.11ax) (HE) stations 104, and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.1 lax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one master station 102 that is part of an extended service set (ESS). A controller (not illustrated) may store information that is common to the more than one master stations 102.

The legacy devices 106 may operate in accordance with one or more of IEEE 802.11 a/b/g/n/ac/ad/af/ah/aj/ay, or another legacy wireless communication standard. The legacy devices 106 may be STAs or IEEE STAs. The HE STAs 104 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 104 may be termed high efficiency (HE) stations.

The master station 102 may communicate with legacy devices 106 in accordance with legacy IEEE 802.11 communication techniques. In example embodiments, the master station 102 may also be configured to communicate with HE STAs 104 in accordance with legacy IEEE 802.11 communication techniques.

In some embodiments, a HE frame may be configurable to have the same bandwidth as a channel. The HE frame may be a PPDU.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

A HE frame may be configured for transmitting a number of spatial streams, which may be in accordance with MU-MIMO and may be in accordance with OFDMA. In other embodiments, the master station 102 HE STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM, Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a TXOP. The master station 102 may transmit a HE master-sync transmission, which may be a trigger frame or control and schedule transmission, at the beginning of the HE control period. The master station 102 may transmit a time duration of the TXOP and sub-channel information. During the HE control period, HE STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a sub-channel smaller than the operating range of the master station 102. During the HE control period, legacy stations refrain from communicating. The legacy stations may need to receive the communication from the master station 102 to defer from communicating.

In accordance with some embodiments, during the TXOP the HE STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (TDMA) technique. In some embodiments, the multiple access technique may be a space-division multiple access (SDMA) technique. In some embodiments, the multiple access technique may be a Code division multiple access (CDMA).

The master station 102 may also communicate with legacy stations 106 and/or HE stations 104 in accordance with legacy IEEE 802.11 communication techniques. In some embodiments, the master station 102 may also be configurable to communicate with HE stations 104 outside the HE TXOP in accordance with legacy IEEE 802.11 communication techniques, although this is not a requirement.

In some embodiments the HE station 104 may be a "group owner" (GO) for peer-to-peer modes of operation. A wireless device may be a HE station 102 or a master station 102.

In some embodiments, the HE station 104 and/or master station 102 may be configured to operate in accordance with IEEE 802.11mc.

In example embodiments, the HE station 104 and/or the master station 102 are configured to perform the methods and functions described herein in conjunction with FIGS. 1-8.

Figure 2:
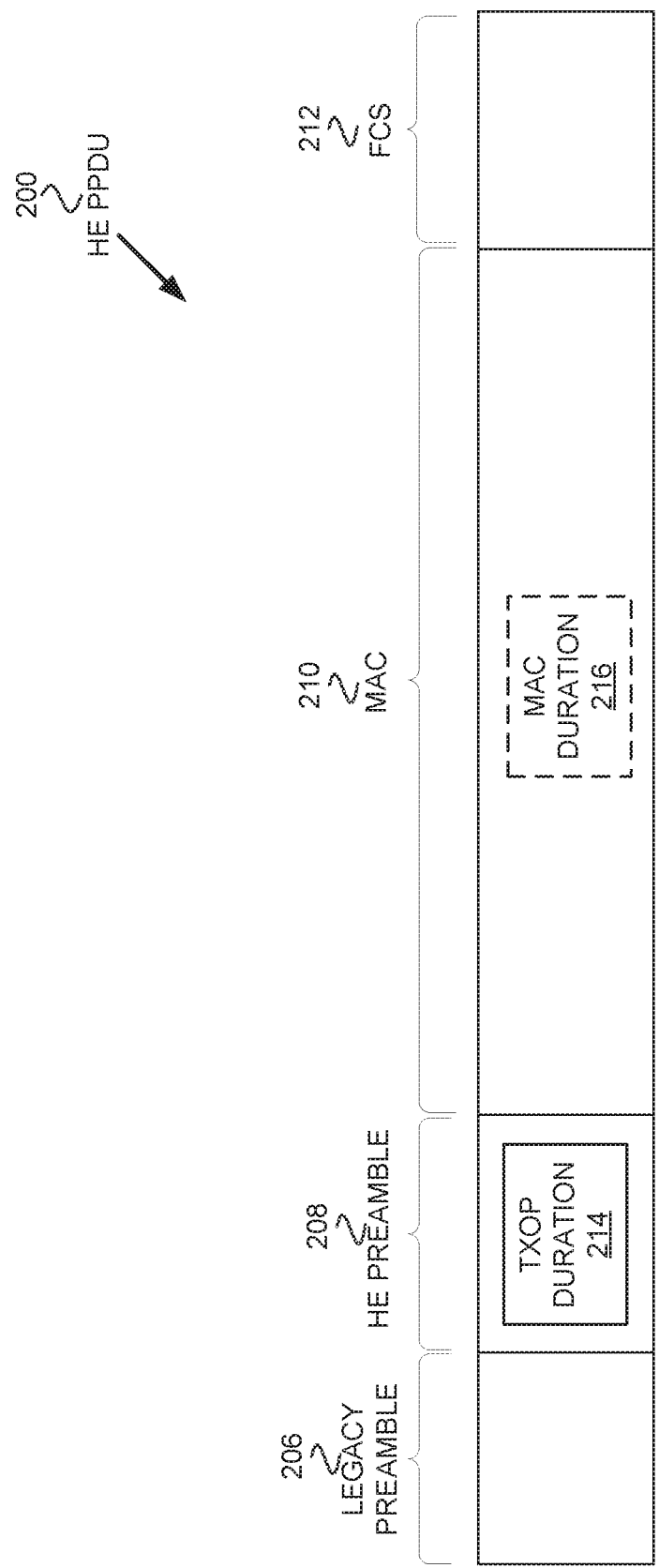
FIG. 2 illustrates a HE physical-layer convergence procedure (PLCP) protocol data unit (PPDU) including a transmission opportunity (TXOP) duration in accordance with some embodiments.

FIG. 2 illustrates a HE physical-layer convergence procedure (PLCP) protocol data unit (PPDU) 200 including a transmission opportunity (TXOP) duration 214 in accordance with some embodiments.

The PPDU 200 includes a legacy preamble 206, a HE preamble 208, a media access control (MAC) 210 layer portion, and a frame check sequence (FCS) 212.

The legacy preamble 206 may include one or more of the following fields legacy short-training fields (STFs) (L-STF), legacy long-training fields (LTFs) (L-LTFs), legacy signal fields (L-SIGs), and etc. The legacy preamble 206 may indicate that the PPDU is an HE PPDU.

The HE preamble 208 may include one or more of the following fields: HE signal fields (e.g., HE-SIG-A repeated HE-SIG-A, HE-SIG-B, HE-SIG-C), HE-STFs, HE-LTFs, etc. The HE preamble 208 may include a TXOP 214. Some HE PPDUs 200 include the MAC 210 may include a MAC duration 216.

The MAC duration 216 may be 16 bits. The TXOP duration 214 may be fewer bits than the MAC duration 216. The TXOP duration 214 may be 15 bits to 2 bits. In some embodiments, the TXOP duration 214 is 7 bits. The TXOP duration 214 may be part of a HE-SIG-A field. The TXOP duration 214 field and the MAC duration 216 field have different granularities and may have different ranges. For example, MAC duration 216 may be 15 bits with a range of 0 to 32,000 us and a granularity of 1 µs. As another example, the TXOP duration 214 may be 7 bits with a range from 0 to 256 µs with a granularity of 8 µs. As another example, the TXOP duration 214 may be 7 bits with a range from 0 to 8 ms with granularity of 256 µs. In some embodiments, the TXOP duration 214 field is termed a duration field, which may be in the HE SIG A preamble portion of the HE PPDU 200.

In some embodiments, TXOP duration 214 field includes a first field that is an integer for the duration and a second field that indicates a granularity of the duration. In some embodiments, a constant may be added to the TXOP duration 214 field. In some embodiments, the TXOP duration 214 field includes a third field that indicates whether a constant should be added to the value indicated by the TXOP duration 214.

In some embodiments, the TXOP duration 214 is not required to set up an entire TXOP limit. TXOP limit may be the maximum amount of time a master station 102 and/or HE station 104 may have a TXOP. In some embodiments, the TXOP duration 214 begins after the transmission of the HE PPDU 200 that includes the TXOP duration 214.

In some embodiments, the TXOP duration 214 may indicate that it does not include duration information, e.g., TXOP duration 214 may be all 1's or all 0's to indicate that the value of the TXOP duration 214 indicates that the TXOP duration 214 does not carry duration information.

In some embodiments, the TXOP duration 214 may have a different number of bits depending on the type of the HE PPDU 200. For example, in some embodiments a HE PPDU 200 that is a HE trigger based (TB) PPM may have a same number of bits as the MAC duration 216 to match the range and granularity of the MAC duration 216, e.g., 15 bits compared to 7 bits for a HE SU PPDU or a HE MU PPDU. The range of the MAC duration 216, in some embodiments, is 32 ms.

In some embodiments, the master station 102 is configured to set the MAC duration 216 and/or TXOP duration 214 to an end of a TXOP, which may include multiple exchanges of HE PPDUs 200 between the master station 102 and the HE stations 104. In these embodiments, the granularity of the TXOP duration 214 may have to be large to accommodate the large range which may result in other stations deferring for longer than necessary.

In some embodiments, NAV protection (as set by the TXOP duration 214 or the MAC duration 216) can be cancelled by sending a contention-free (CF)-End frame, which may take approximately 40 μs, which may be time consuming. If a master station 102 sends a CF-End it may only clear the NAVs around the master station 102 and not NAVs that were set by HE stations 104 (e.g., that were communicating with the master station 102) that were not reachable by the master station 102.

Table 1 illustrates some settings for TXOP duration 214. For example, for a 9 bit TXOP duration 214 the granularity may be 8 μs for range of 0 to [8*(2^9−1)]μs, which is approximately 4 ms. In some embodiments, the granularity is between 1 μs and 32 μs with an available range of at least 4 ms and less than or equal to the available range of the MAC duration 216. In some embodiments, the granularity is smaller than 256 μs. The greater the granularity of the TXOP duration 214, the greater the difference between the MAC duration 216 and the TXOP duration 214.

TABLE 1

Settings for TXOP DURATION

| BITS | GRANULARITY | RANGE |
|---|---|---|
| 7 | 32 μs | 0 to [32 *(2^7 − 1)] μs (approximately 4 ms) |
| 8 | 16 μs | 0 to [16 *(2^8 − 1)] μs (approximately 4 ms) |
| 8 | 32 μs | 0 to [32 *(2^8 − 1)] μs |
| 9 | 8 μs | 0 to [8 *(2^9 − 1)] μs (approximately 4 ms) |
| 9 | 16 μs | 0 to [16 *(2^9 − 1)] μs |
| 9 | 32 μs | 0 to [32 *(2^9 − 1)] μs |
| 10 | 4 μs | 0 to [4 *(2^10 − 1)] μs (approximately 4 ms) |
| 10 | 8 μs | 0 to [8 *(2^10 − 1)] μs |
| 10 | 16 μs | 0 to [16 *(2^10 − 1)] μs |
| 10 | 32 μs | 0 to [32 *(2^10 − 1)] μs |
| 11 | 2 μs | 0 to [2 *(2^11 − 1)] μs (approximately 4 ms) |
| 11 | 4 μs | 0 to [4 *(2^11 − 1)] μs |
| 11 | 8 μs | 0 to [8 *(2^11 − 1)] μs |
| 11 | 16 μs | 0 to [16 *(2^11 − 1)] μs |
| 11 | 32 μs | 0 to [32 *(2^11 − 1)] μs |
| 12 | 1 μs | 0 to [1 *(2^12 − 1)] μs (approximately 4 ms) |
| 12 | 2 μs | 0 to [2 *(2^12 − 1)] μs |
| 12 | 4 μs | 0 to [4 *(2^12 − 1)] μs |
| 12 | 8 μs | 0 to [8 *(2^12 − 1)] μs |
| 13 | 1 μs | 0 to [1 *(2^13 − 1)] μs (approximately 8 ms) |
| 13 | 2 μs | 0 to [2 *(2^12 − 1)] μs |
| 13 | 4 μs | 0 to [4 *(2^12 − 1)] μs |
| 14 | 1 μs | 0 to [1 *(2^12 − 1)] μs (approximately 16 ms) |
| 14 | 2 μs | 0 to [2 *(2^12 − 1)] μs |
| 15 | 1 μs | 0 to [1 *(2^15 − 1)] μs (approximately 32 ms) |

Wireless devices, e.g., master stations 102 and/or HE stations 104 may use the TXOP duration 214 and/or MAC duration 216 to determine whether to set network allocation vectors (NAVs) and defer accessing the wireless medium.

The FCS 212 may include a checksum to detect corruption of the PPDU during transmission. The HE PPDU 200 may be a HE single user (SU), HE SU extended range (EXT), HE multiple user (MU), or HE TB PPM. In some embodiments, the HE PPDU 200 may be a different type of HE PPDU 200.

In some embodiments, the HE preamble 208 may include a color field (not illustrated) that indicates a BSS of the transmitting wireless device, e.g., master station 102 or HE station 104. Some wireless device, e.g., master stations 102 or HE stations 104, may decode the HE preamble 208 that includes the color field and determine that they do not need to decode the MAC 210 layer portion of the HE PPDU 200. The master stations 102 or HE stations 104 may use the TXOP duration 214 to determine whether or not to set one or more network allocation vectors (NAVs), which, in some embodiments, is termed a virtual carrier sense (CS). The TXOP duration 214 being placed in the HE preamble 208 so that the master stations 102 or HE stations 104 do not have to decode the MAC 210 may conserve resources of the master stations 102 and/or HE stations 104, e.g., it may conserve power by not having to decode the MAC 210 layer portion of the HE PPDU 200.

Figure 3:
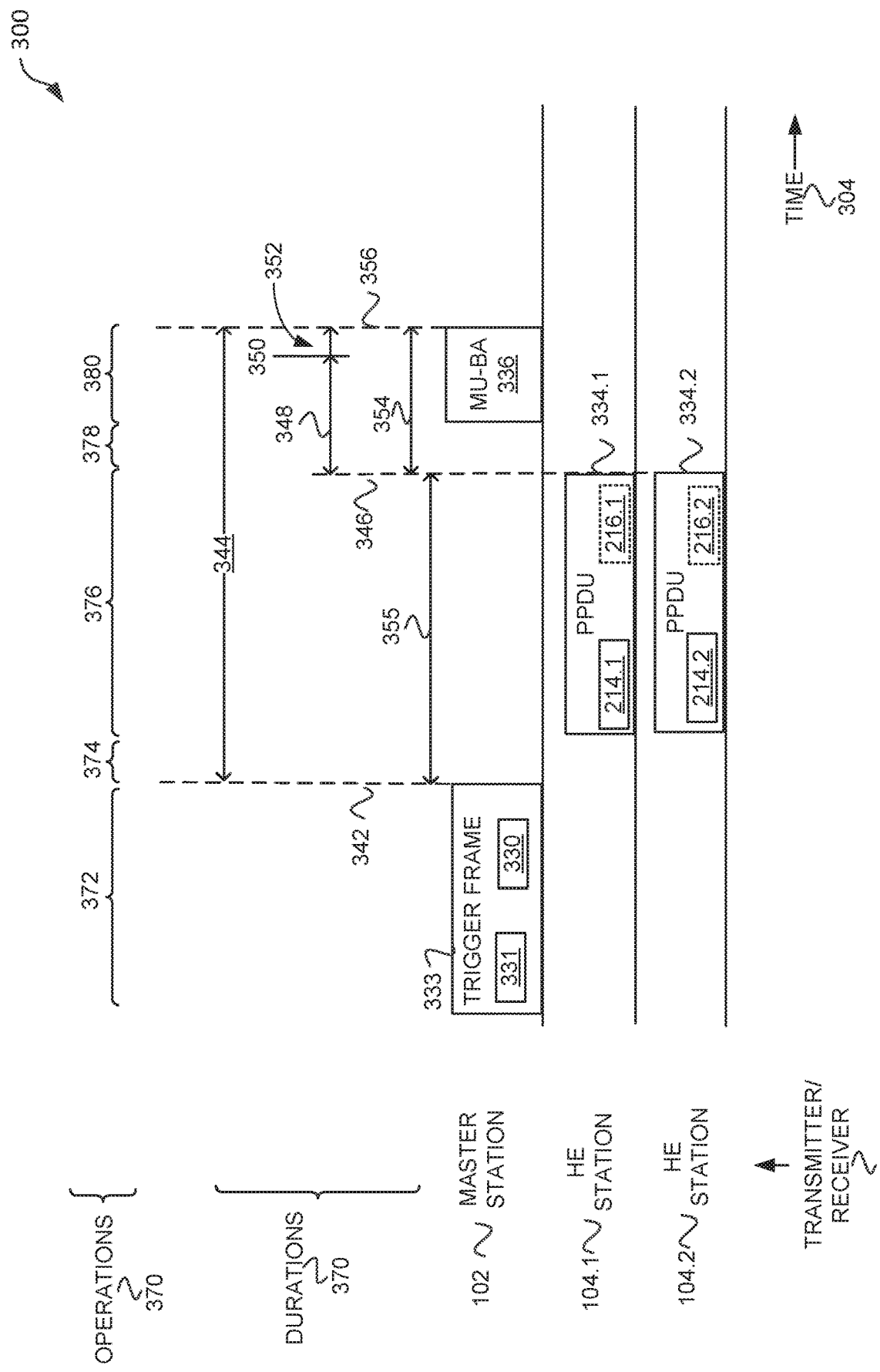
FIG. 3 illustrates a method of setting a TXOP duration field in a HE signal field in accordance with some embodiments.

FIG. 3 illustrates a method 300 of setting a TXOP duration field in a HE signal field in accordance with some embodiments. Illustrated in FIG. 3 is time 304 along a horizontal axis, transmitter/receiver 306 along a vertical axis, durations 370 along the top, and operations 370 along the top.

The method 300 begins at operation 372 with the master station 102 transmitting a trigger frame 333. The trigger frame 333 may include a MAC duration 330 field. The value of the MAC duration 344 may be from the end of the transmission of trigger frame 333, which may be at time 342 to the end of the transmission of MU block acknowledgment (MU-BA) 336, which may be at time 356. The trigger frame 333 may include a resource allocation 331 for the HE stations 104 to transmit UL PPDUs to the master station 102.

The method 300 continues at operation 354 with the HE stations 104 waiting a duration 354 before transmitting, e.g., a short interframe space (SITS) time.

The method 300 continues at operation 376 with the HE stations transmitting PPDUs 334. In some embodiments, the PPDUs 334 do not include the MAC duration 216. For example, the PPDUs 334 may be HE TB PPDUs. In some embodiments, the PPDUs 334 may include MAC duration 216.

In some embodiments, the HE stations 104 set the TXOP duration 214 in the following way. The HE stations 104 calculates potential duration 354, which may be in microseconds, as the MAC duration 330 (duration 344) minus the duration 355 between the end of the trigger frame 333 (time 342) and the end of the PPM 334 (time 346). In some embodiments, if potential duration 354 includes a fractional microsecond, then the potential duration 354 is either rounded up or down. In some embodiments, the potential duration 354 is rounded up to the next higher integer.

The HE stations 104 then set the value of the TXOP duration 214 to be the highest value that is less than or equal to the potential duration 354.

For example, in some embodiments, the MAC duration 330 is 15 bits with a granularity of 1 µs and the TXOP duration 214 is 7 bits with a granularity of 8 µs. If potential duration 354 was 254 µs, then the value of the TXOP duration 214 could be set to 248 µs (the next higher value is 256 which is over 254 µs). The value of the TXOP duration 214 is duration 348. The difference between the potential duration 354 and the duration 348 is duration 352. Duration 352 is 4 µs in the example above.

If the PPDUs 334 include the MAC duration 216, then the H E stations 104 may calculate the value of the MAC duration 216 as the value of the MAC duration 330 minus duration 355 (which may be determined as above) The MAC duration 216 may be the same number of bits as the MAC duration 330 so that the MAC duration 216 may be set to within a granularity (e.g., 1 µs of time 356.)

In some embodiments, the HE stations 104 and/or master station 102 are configured to set the duration value indicated by the TXOP duration field based on the TXOP duration field having two fields. A first field indicates the duration as an integer value and a second field indicates a granularity to multiple the first field to get the value of the duration. For example, the first field may be 20 and the granularity may be 6 µs for a duration value of 120 µs. In some embodiments, a constant is added to the value of duration, e.g., 500 µs or another value. In some embodiments, the TXOP duration field includes a third field that indicates whether the constant should be added to the duration, and in some embodiments which constant to add to the duration.

A smaller granularity for the TXOP duration 214 reduces the size of duration 352. The duration 352 may have a granularity smaller than an interspace time before other stations begin transmitting so that the master station 102 has a change to begin transmitting another FIE PPDU 200 to extend a TXOP. For example, the granularity of TXOP duration 214 may be smaller than a SIFS.

In some embodiments, where the PPDU 334 includes the MAC duration 216, the HE station 104 may first calculate the MAC duration 216, and then set the value of the TXOP duration 214 to be the largest value that is not over the MAC duration 216. In the example above, the MAC duration 216 would be determined as the same as the potential duration 354, which was 254 µs. The value of the TROP duration 214 would then be set to 248 µs (the next higher value is 256 which is over 254 µs).

In some embodiments, the MAC duration 216 is always set to be at least as large as the TXOP duration 214. The method 300 continues at operation 378 with waiting a period of time which may be a SIFS. The method 300 continues at operation 380 with master station 102 transmitting MU-BAs 336 to the HE stations 104, which may acknowledge the PPDUs 334.

Figure 4:
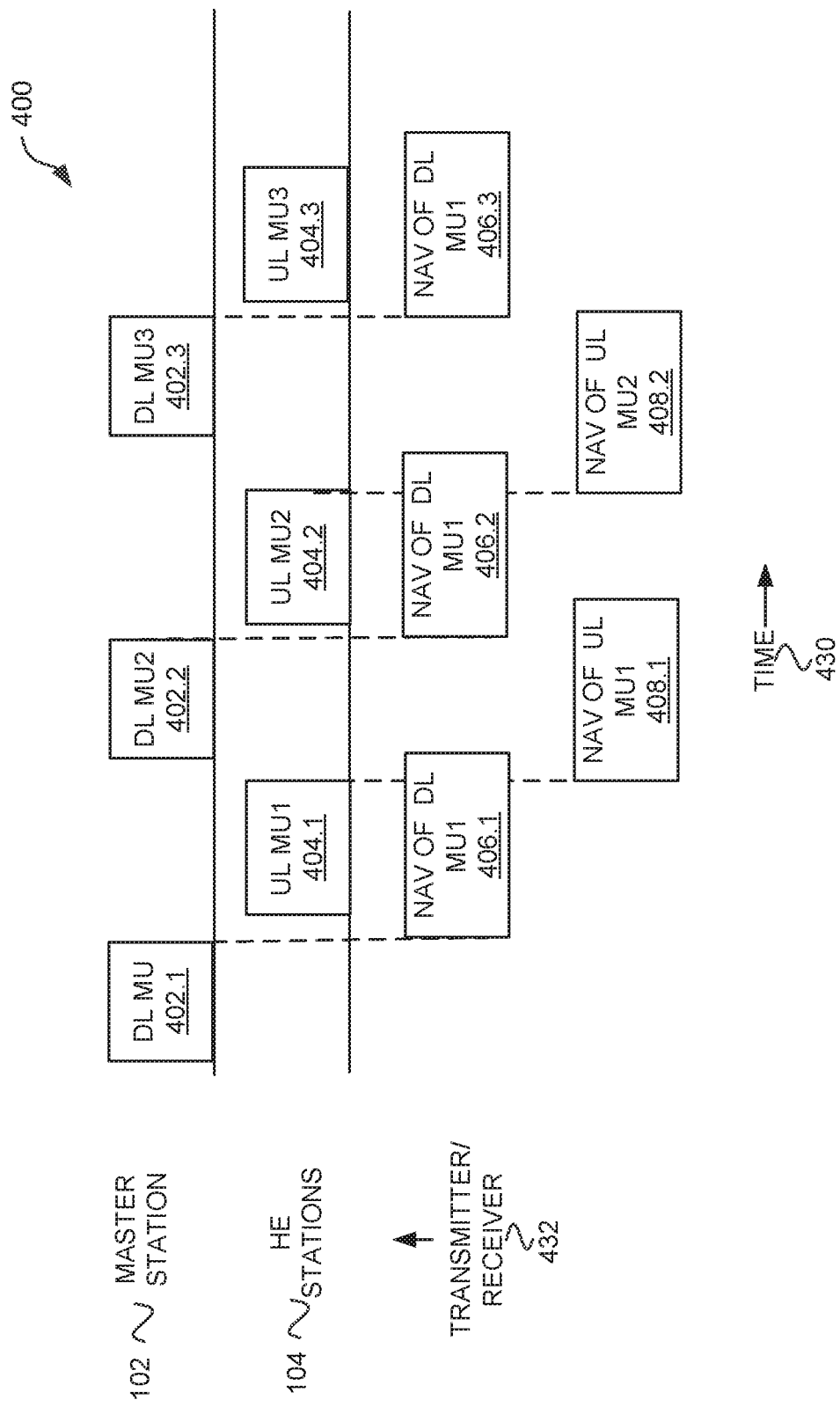
FIG. 4 illustrates how a TXOP may be extended by the TXOP holder in accordance with some embodiments.

FIG. 4 illustrates how a TXOP may be extended by the TXOP holder 400 in accordance with some embodiments. Illustrated in FIG. 4 is time 430 along a horizontal axis and transmitter/receiver 432 along a vertical axis. The master station 102 may transmit a DL MU 402.1 with a NAV of DL MU1 406.1. The NAV of DL MU1 406.1 may indicate that other stations are to defer until a time either right before or when DL MU2 402.2 is to be transmitted. The NAV of DL MU1 406.1 may indicate that an HE station 104 setting its NAV based on the DL MU 402.1 would set the NAV with a duration of NAV of DL MU1 406.1.

HE stations 104 receive the DL MU 402.1 and transmit UL MU1 404.1 which include NAV of UL MU1 408.1. Since both NAV of DL MU1 406.1 and NAV of UL MU1 408.1 extend to the start of DL MU2 402.2, the master station 102 can extend the TXOP by transmitting DL MU2 402.2 with NAV of DL MU1 406.1. Moreover, the hidden stations may be deferred by NAV of UL MUs 408 that extend to the next UL MU 404.

FIG. 4 illustrates that the range of the TXOP duration 214 need only be long enough to cover one following frame transmission, so that the NAVs of other HE stations 104 are long enough to enable the master station 102 to extend the TXOP. For example, NAV of DL MU1 406.1 needs to be long enough so that a short interframe space (SIFS) (the HE station 104 will wait a SIFS after the NAV to perform a physical clear channel assessment (CCA)) plus the NAV of DL MU1 406.1 gives the master station 102 enough time to extend the TXOP by transmitting again. The master station 102 waits a time less than the SIFS after a NAV setting to begin transmitting again. In some embodiments, the duration of a TXOP limit is 4 ms. For example, a HE station 104 that determined it should set a NAV (e.g., defer) based on the communications of FIG. 4, and that received DL MU 402.1, UL MU1 404.1, DL MU2 402.2, UL MU2 404.2, DL MU3 402.3, and UL MU3 404.3, would updates its NAV based on the NAV of DL MU1 406.1, NAV of UL MU1 408.1, NAV OF DL MU1 406.2, NAV of UL MU2 408.2, and NAV of DL MU1 406.3. So, the HE station 104 would not get an opportunity to transmit before the master station 102 or HE stations 104 extended the NAV of the HE station 104.

The NAV of DL MU1 406 may indicate the MAC duration 216 and/or TXOP duration 214 set by the master station 102 in the respective DL MU 402. The NAV of UL MU1 408 may indicate the MAC duration 216 and/or TXOP duration 214 set by the HE stations 104 in the respective UL MU1 404. The DL MU 402 may be a trigger frame that may include DL data and resource allocations for UL transmissions (UL MU 404) from the HE stations 104. The UL MU 404 may be UL transmissions to the master station 102 in accordance with a resource allocation included in the respective DL MUs 402.

Figure 5:
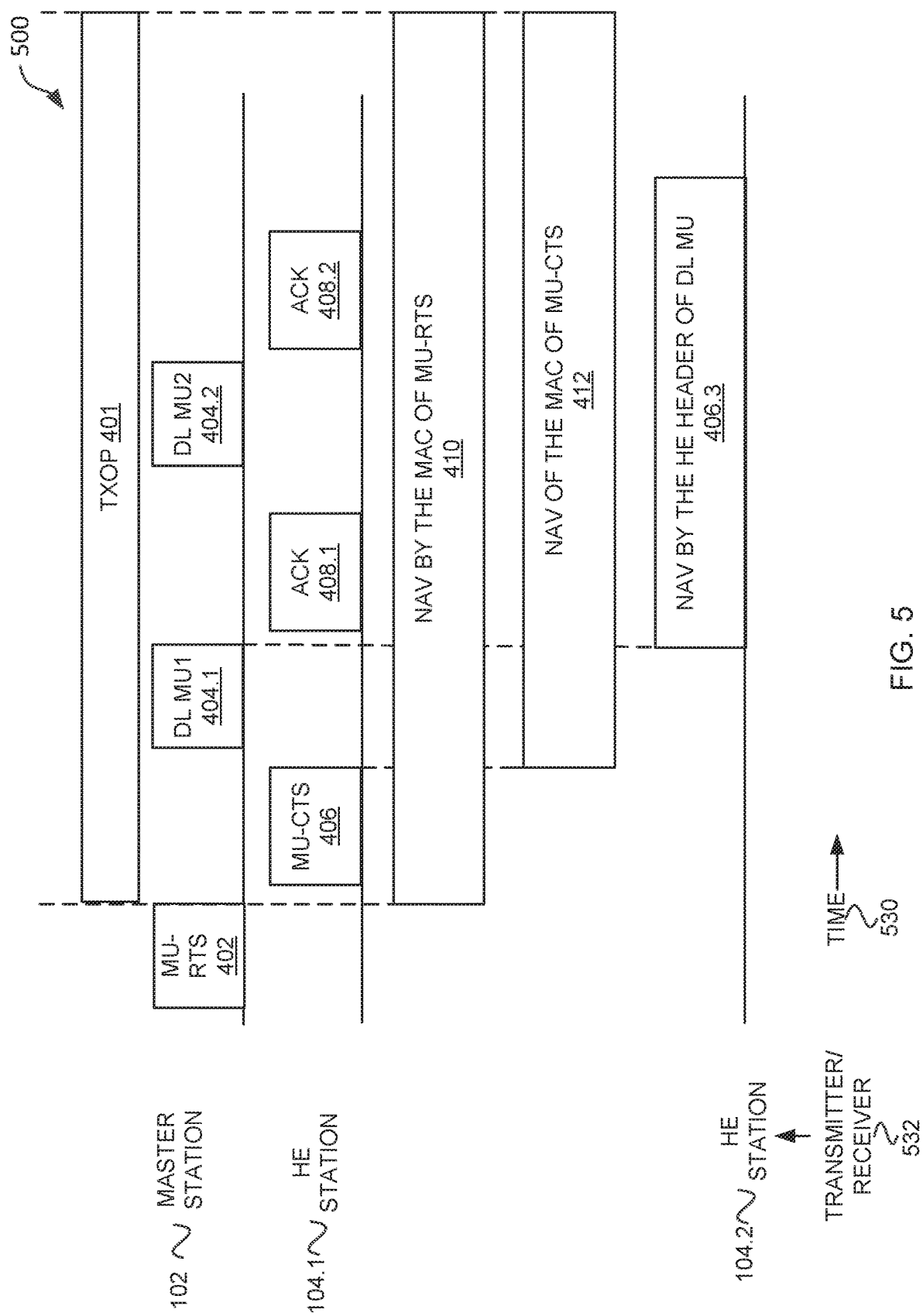
FIG. 5 illustrates a TXOP duration setting that is less than a MAC duration setting in accordance with some embodiments.

FIG. 5 illustrates a TXOP duration setting that is less than a MAC duration setting 500 in accordance with some embodiments. Illustrated in FIG. 5 is time 530 along a horizontal axis, transmitter/receiver 532 along a vertical axis, and an indication of a duration of a TXOP 401 along the top. The master station 102 may transmit a MU-RTS 402 that includes a NAV by the MAC of MU-RTS 410 that extends to the end of a TXOP 401. The NAV by the MAC of MU-RTS 410 indicates how long a NAV would be set by a HE station 102 and/or legacy device 106 based on a MAC duration of the MU-RTS 402.

The MU-RTS 402 may not include a HE header with a TXOP duration 214. A HE station 104 may transmit a MU-CTS 406 with a NAV of the MAC of MU-CTS 412 that extends to the end a TXOP 401. The NAV by the MAC of MU-CTS 412 indicates how long a NAV would be set by a HE station 102 and/or legacy device 106 based on a MAC duration of the MU-CTS 406. The MU-CTS 406 may not include a HE header with a TXOP duration 214.

The master station 102 may transmit a DL MU1 404.1 that includes a NAV by the HE header of DL MU 406.3. The NAV by the HE header of DL MU 406.3 indicates how long a NAV would be set by a HE station 102 based on a TXOP duration in the HE header of the DL MU1 404.1.

The master station 102 may also include a MAC duration 216, which would extend to the end of the TXOP 401. The NAV by the HE header of DL MU 406.3 may be shorter than the TXOP 401 due to a range limitation of a TXOP duration 214 of the DL MU1 406.1, e.g. the TXOP duration 214 may only be 7 bits and the MAC duration 216 may be 15 bits. The HE station 104.2 may determine to defer based on communications between the master station 102 and the HE station 104.1. The HE station 104.2 may receive the NAV by the HE header of DL 406.3 and defer based on the value of the NAV by the HE header of DL MU 406.3, which may be due to the HE station 104.2 not decoding a MAC-layer portion of the DL MU1 404.1 that includes a MAC duration 216.

The HE station 104.2 may receive a subsequent indication to further defer from the ACK 408.1, DL MU2 404.2, or ACK 408.2, so that the HE station 104.2 does not attempt to transmit during the TXOP 401. If the HE station 104.2 had decoded the MU-RTS 402 or the MU-CTS 406, then the HE station 104.2 may have set a NAV to defer for the whole TXOP 401 and the HE station 104.2 would ignore the NAV by the HE header of DL MU 406.3 because it is shorter.

In some embodiments, legacy devices 106 will set their NAV based on the MU-RTS 402 and MU-CTS 406 and may ignore the DL MU 404.

Figure 6:
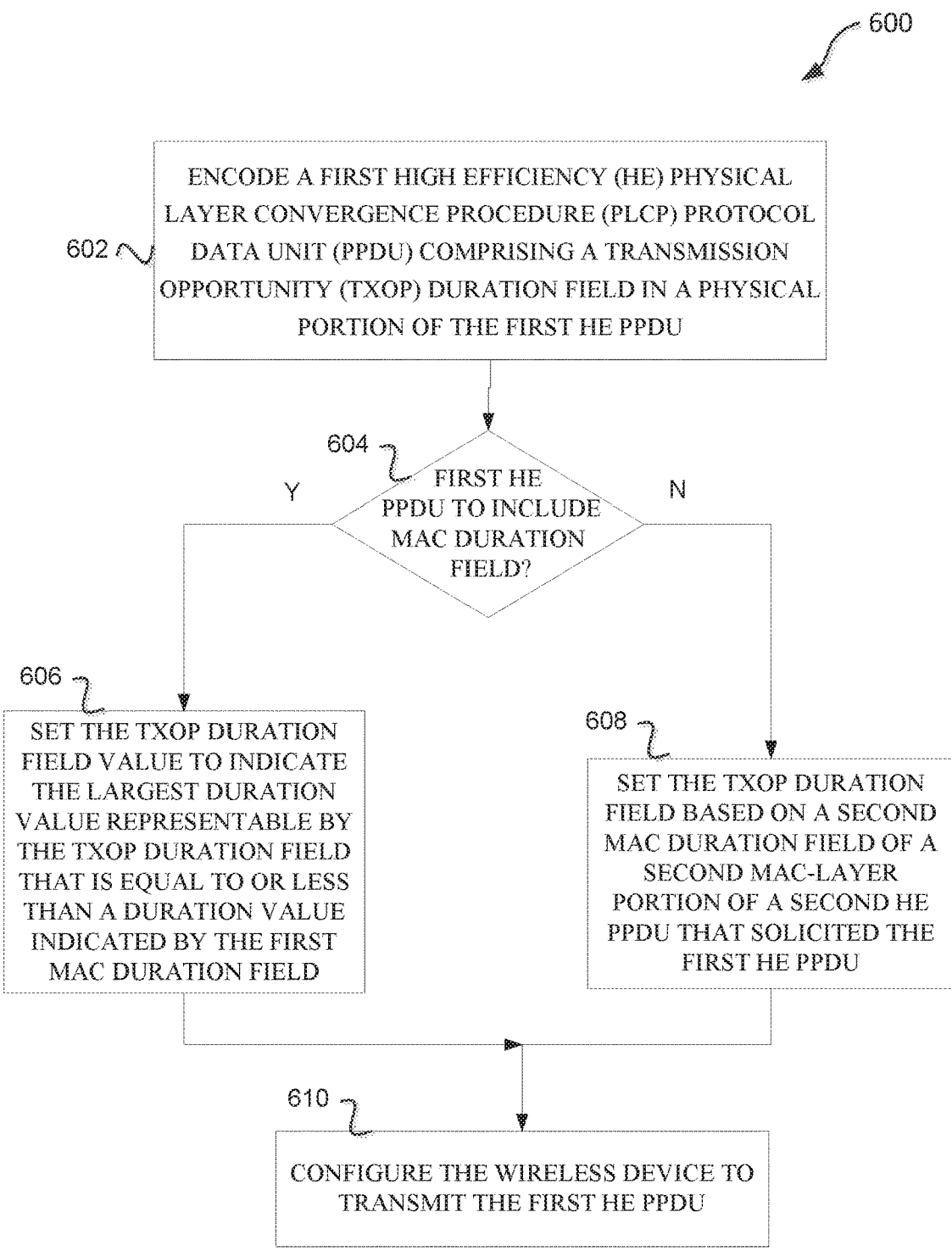
FIG. 6 illustrates a method for a TXOP duration Feld in a HE signal (HE-SIG) field in accordance with some embodiments.

FIG. 6 illustrates a method 600 for a TROP duration field in a HE signal (HE-SIG) field in accordance with some embodiments. The method 600 begins at operation 602 with encoding a first HE PPDU comprising a TXOP duration field in a physical-layer portion of the first HE PPDU. For example, HE station 104 may encode TXOP duration 214.

The method 600 may continue at operation 604 with is the first HE PPDU to include a MAC duration field in a MAC-layer portion of the first HE PPDU. For example, an apparatus of HE station 104.1 of FIG. 3 may determine whether the PPDU 334 is to include the MAC duration 216.1 field, which may be based on a type of the HE PPDU.

If the first HE PPDU is not to include the MAC duration field, then the method 600 continues at operation 608 with setting the TXOP duration field based on a second MAC duration field of a second MAC-layer portion of a second HE PPDU that solicited the first PPDU. For example, HE station 104.1 may set TXOP duration 214.1 field to based on MAC duration field 330 of trigger frame 333.

If the first HE PPDU is to include the MAC duration field, then the method 600 continues at operation 606 with setting the TXOP duration field value to indicate the largest duration value representable by the TXOP duration field that is equal to or less than a duration value indicated by the first MAC duration field. For example, HE station 104.1 may set the TXOP duration 214.1 field to be the largest value that is less than MAC duration 216 field.

The method 600 may continue from operation 606 and operation 608 to operation 610 with configuring the wireless device to transmit the first HE PPDU. For example, an apparatus of HE station 104.1 may configure the HE station 104.1 to transmit PPDU 334.1.

Figure 7:
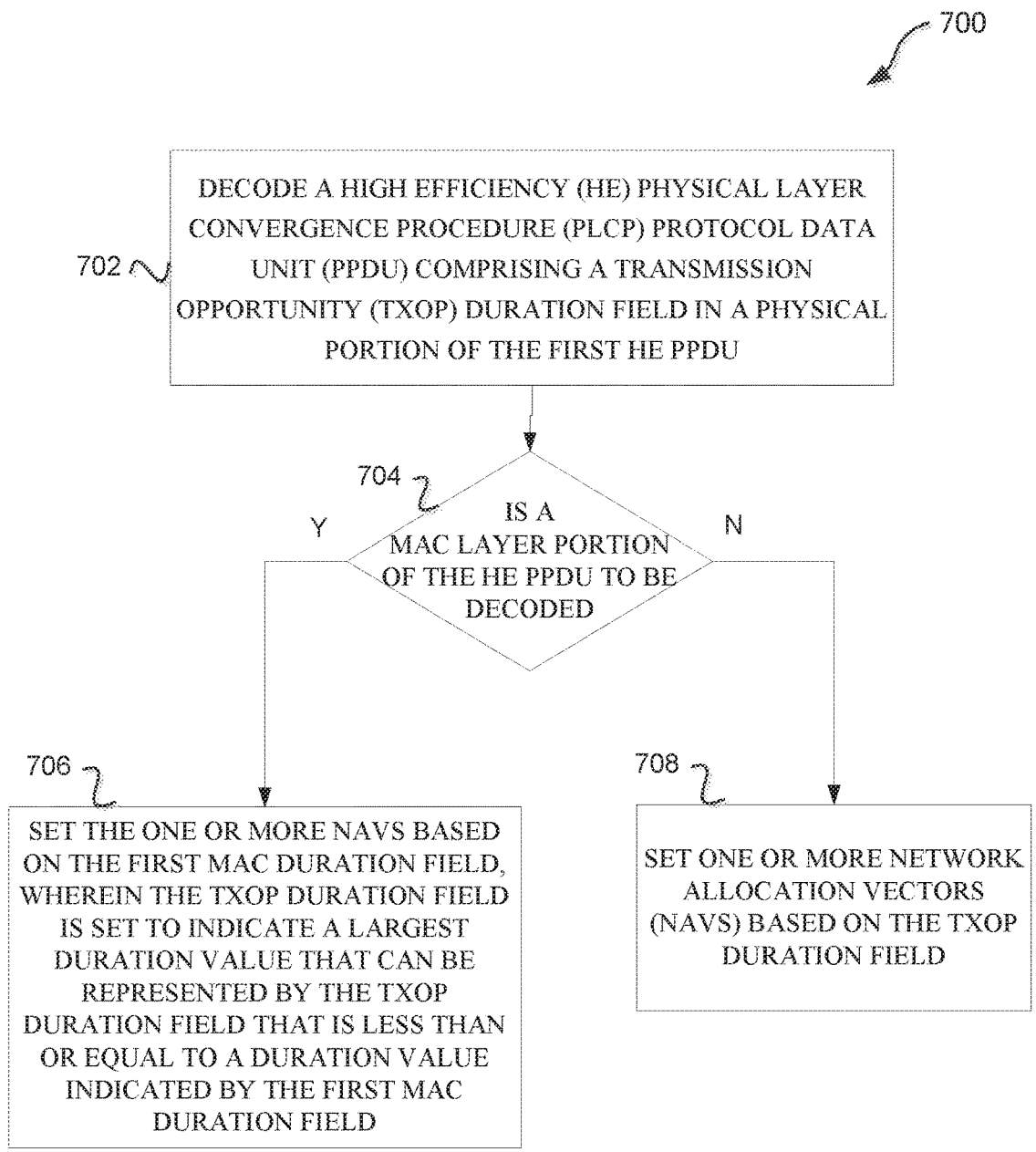
FIG. 7 illustrates a method for a TXOP duration field in a HE-SIG field in accordance with some embodiments.

FIG. 7 illustrates a method 700 for a TXOP duration field in a HE-SIG field in accordance with some embodiments. The method begins at operation 702 with decoding a HE PPDU comprising a TXOP duration field in a physical-layer portion of the first HE PPDU. For example, HE station 104.2 of FIG. 5 may decode DL MU1 404.1.

If a MAC-layer portion of the HE PPDU is not to be decoded or the MAC-layer portion does not include a MAC duration field, then the method 700 continues at operation 708 with setting one or more network allocation vectors (NAVs) based on the TXOP duration field. For example, HE station 104.2 of FIG. 5 may decode DL MU1 404.1 and determine that the PPDU is from a master station 102 that is not part of the same BSS as HE station 104.2. HE station 104.2 may then set one or more NAVs based on the TXOP duration and not decode the MAC-layer portion of the DL MU1 404.1 or DL MU1 404.1 may not include a TXOP duration.

If a MAC-layer portion of the HE PPDU is decoded and the MAC-layer portion includes a MAC duration field, then the method 700 continues at operation 706 with setting the one or more NAVs based on the first MAC duration field, wherein the TXOP duration field is set to indicate a largest duration value that can be represented by the TXOP duration field that is less than or equal to a duration value indicated by the first MAC duration field.

For example, HE station 104.2 of FIG. 5 may be part of a same BSS of the master station 102 and may decode the MAC-layer portion of the UL MU1 404.1 (which may include a MAC duration 216) and set one or more NAVs based on a MAC duration 216 of the UL MU1 404.1.

In some embodiments, the value in the MAC duration 216 field, if used for NAV setting and not for other purposes, is set equal to the TXOP duration 214 field in HE-SIG-A if the MAC packet is carried in the same PPDU with a HE-SIG-A physical layer header. In some embodiments, this prevents the duration indicated in the MAC duration 216 field from being much longer than the value indicated in the TXOP duration 214 of the same HE PPDU 200 and maintains consistency of NAV setting for HE stations 104 setting their NAVs from the HE PPDU 200. If the MAC duration 216 field and the TXOP duration 214 are part of the same HE PPDU 200, then the MAC duration 216 may be decoded only by intra-BSS HE stations 104 if the HE PPDU 200 is a HE SU PPDU or only decoded by intra-BSS HE stations 104 that decode the HE PPDU 200 for an UL resource allocation. In some embodiments, the MAC duration 216 fields in HE MU PPDU and HE TB PPDU are not decoded by HE stations 104.

In some embodiments, the value indicated by the MAC duration 216 field is larger than the TXOP duration 214 field under a first frame exchange such as an initial handshake, which is the exchange of two frames (each inside an HT-mixed format PPDU) that establish protection (e.g., RTS/CTS); or an initial frame that establishes protection but generates no response (e.g., a CTS to self). In this case, the value in the TXOP duration 214 field in the first frame is required to cover the duration of response frame plus SIFS. HE stations 104 may be configured with NAV cancellation rules to reconcile TXOP duration 214 fields that indicate different values than MAC duration 216 fields do.

In some embodiments, the NAV setting rule for the TXOP duration in HE-SIG-A for responding HE SU PPDU may be that TXOP duration 214 field indicates a value when part of a HE SU PPDU that is responding to another HE PPDU that is the smallest feasible value larger than the value obtained from the TXOP duration 214 field of the immediately previous HE PPDU, minus the time, in microseconds, required to transmit the responding HE SU PPDU and applicable interframe space (IFS) (e.g., SIFS).

In some embodiments, the TXOP duration 214 field may be set to indicate a duration value of D in accordance with the following:

1) If $T_{TXOP}=0$ and $T_{END\_NAV}=0$, then $D=\min(T_{NAV-MAX-HE-SIG-A}, T_{SINGLE-MSDU}-T_{PPDU})$;

2) Else If $T_{TXOP}=0$ and $T_{END\_NAV}>0$, then $D=\min(\max(0, T_{MAX-END-NAV}-T_{PPDU}), T_{NAV-MAX-HE-SIG-A})$;

3) Else If $T_{END\_NAV}=0$, then $\min(T_{NAV-MAX-HE-SIG-A}, T_{PENDING}, T_{TXOP}-T_{PPDU}) \Leftarrow D \Leftarrow T_{TXOP}-T_{PPDU}$;

4) Else $\min(T_{MAX-END-NAV}-T_{PPDU}, T_{NAV-MAX-HE-SIG-A}) \Leftarrow D \Leftarrow T_{TXOP-REMAINING}-T_{PPDU}$.

$T_{PENDING}$ is the estimated time required for the transmission of: pending MPDUs of the same AC; any associated immediate response frames; any high-throughput (HT) null data packets (NDPs), very-HT (VHT) NDPs, or beamforming report poll frame transmission and explicit feedback response frames; applicable interframe space; and, any reverse direction grants (RDGs). $T_{END-NAV}$ is the remaining duration of any NAV set by the TXOP holder, or 0 if no NAV has been established.

$T_{MAX-END-NAV}$ is the maximum of the remaining duration of any NAV set by the TXOP holder or 0 if no NAV has been established. $T_{MAX-END-NAV}$ is the maximum of the remaining duration of any NAV set by the TXOP holder or 0 if no NAV has been established. $T_{NAV-MAX-HE-SIG-A}$ is the maximum duration of the NAV that can be set by the TXOP duration field in HE-SIG-A of the PPDU that carries the HE-SIG-A. This value may be different for the HE-SIG-A in HE SU PPDU, HE MU PPDU, or HE TB PPDU. If the HE station 104 is determining the NAV setting for HE SU PPDU, HE MU PPDU, or HE TB PPDU, then $T_{NAV-MAX-HE-SIG-A}$ is the value corresponding to HE SU PPDU, HE MU PPDU, or HE TB PPDU respectively.

When a HE station 104 prepares the value of TXOP duration 214 field in a HE-SIG-A of HE SU PPDU, HE MU PPDU, or HE TB PPDU, different NAV setting rule may apply depending on the available bits in HE-SIG-A.

In some embodiments, the TXOP duration 214 field may be set to indicate a duration value of D in accordance with the following:

1) If $T_{TXOP}=0$ and $T_{END\_NAV}=0$, then $0 \leq D \leq T_{SINGLE-MSDU}-T_{PPDU}$;

2) Else If $T_{TXOP}=0$ and $T_{END\_NAV}>0$, then $0 \Leftarrow D \Leftarrow \max(0, T_{MAX-END-NAV}-T_{PPDU})$;

3) Else If $T_{END\_NAV}=0$, then $0 \Leftarrow D \Leftarrow T_{TXOP}-T_{PPDU}$;

4) Else $0 \Leftarrow D \Leftarrow T_{TXOP-REMAINING}-T_{PPDU}$ $T_{MAX-END-NAV}$ is the maximum of the remaining duration of any NAV set by TXOP holder or 0 if no NAV has been established.

Figure 8:
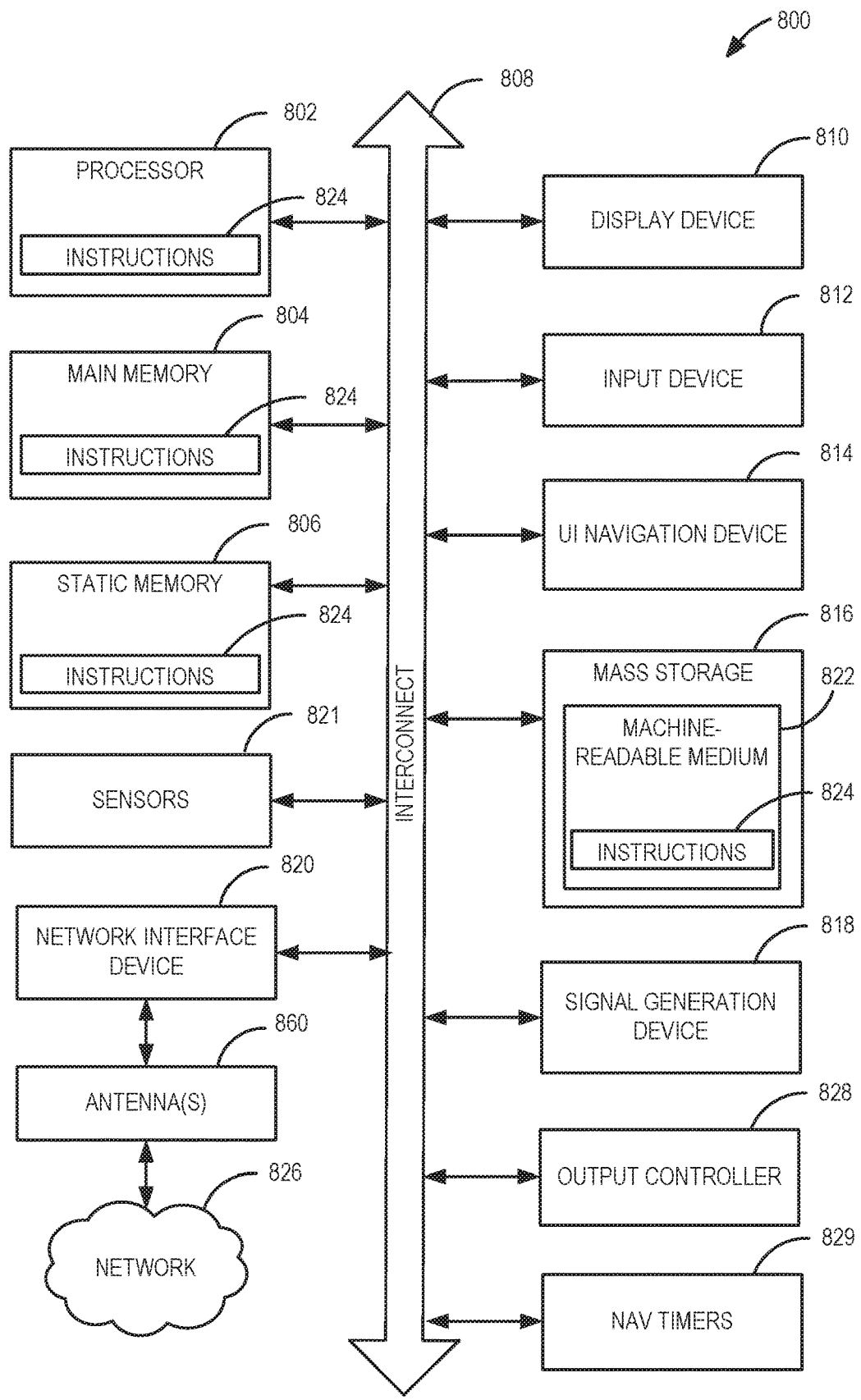
FIG. 8 illustrates a block diagram of an example machine up on which any one or more of the techniques (e.g., methodologies) discussed herein may perform.

FIG. 8 illustrates a block diagram of an example machine 800 up on which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802. (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display device 810, an input device 812 (e.g., a keyboard), and a user interface (UI) navigation device 814 (e.g., a mouse). In an example, the display device 810, input device 812 and UI navigation device 814 may be a touch screen display. The machine 800 may additionally include a mass storage (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 802 and/or instructions 824 may comprise processing circuitry and/or transceiver circuitry.

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

An apparatus of the machine 800 may be one or more of a hardware processor 802. (e.g., a central processing unit (CPU), a graphics processing unit (GPU), a hardware processor core, or any combination thereof), a main memory 804 and a static memory 806, some or all of which may communicate with each other via an interlink (e.g., bus) 808.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 820 may include one or more physical jacks (e.g., Ethernet, coaxial, or phone jacks) or one or more antennas to connect to the communications network 826. In an example, the network interface device 820 may include one or more antennas 860 to wirelessly communicate using at least one of single-input multiple-output (SINK)), multiple-input multiple-output (MIMO), or multiple-input single-output (MISO) techniques. In some examples, the network interface device 820 may wirelessly communicate using Multiple User MIMO techniques. The term "transmission medium" shall be taken to include any intangible medium that is capable of storing, encoding or carrying instructions for execution by the machine 800, and includes digital or analog communications signals or other intangible medium to facilitate communication of such software.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Example 1 is an apparatus of a wireless device including: memory; and processing circuitry coupled to the memory, the processing circuitry configured to: encode a first high efficiency (HE) physical-layer convergence procedure (PLOP) protocol data unit (PPDU) including a transmission opportunity (TXOP) duration field in a first physical-layer portion of the first HE PPDU; if the first HE PPDU is to include a first media access control (MAC) duration field in a first MAC-layer portion of the first HE PPDU, set the TXOP duration field value to indicate a largest duration value representable by the TXOP duration field that is equal to or less than a duration value indicated by the first MAC duration field; if the first HE PPDU is not to include the first MAC duration field in the first MAC-laver portion, set the TXOP duration field based on a second MAC duration field of a second MAC-layer portion of a second HE PPDU that solicited the first HE PPDU; and configure the wireless device to transmit the first HE PPDU.

In Example 2, the subject matter of Example 1 optionally includes where the processing circuitry is further configured to: if the first HE PPDU is not to include the first MAC duration field in the first MAC-layer portion of the first HE PPDU, decode the second HE PPDU, the second HE PPDU including at least the second MAC duration field.

In Example 3, the subject matter of any one or more of Examples 1-2 optionally include where the processing circuitry is further configured to: if the first HE PPDU is not to include the first MAC duration field in the first MAC-layer portion, set the TXOP duration field value to indicate a largest duration value representable by the TXOP duration field that is less than or equal to a duration value indicated by the second MAC duration field minus a period of time from a first time of the end of the transmission of the second HE PPDU to a second time when the first PPDU is to end being transmitted.

In Example 4, the subject matter of Example 3 optionally includes where processing circuitry is further configured to: round up or down to an integer the largest duration value indicated by the second MAC duration field minus the period time from a first time of the end of the transmission of the second HE PPDU to a second time when the first PPDU is to end being transmitted.

In Example 5, the subject matter of any one or more of Examples 1-4 optionally include where the each of the following group are in units of microseconds: a duration value indicated by the second MAC duration, the duration value indicated by the first MAC duration, and the duration value indicated by the TXOP duration.

In Example 6, the subject matter of any one or more of Examples 1-5 optionally include where the processing circuitry is further configured to: if the first HE PPDU is to include the first MAC duration field, set the first MAC duration field value to indicate a duration of a remaining time in a current TXOP.

In Example 7, the subject matter of any one or more of Examples 1-6 optionally include where the MAC-layer portion is a physical-layer convergence (PUT) service data unit (PSDU).

In Example 8, the subject matter of any one or more of Examples 1-7 optionally include where the first HE PPDU is a HE trigger based (TB) PPDU and the second HE PPDU is a trigger frame.

In Example 9, the subject matter of any one or more of Examples 1-8 optionally include where the TXOP duration field comprises fewer bits than the MAC duration field.

In Example 10, the subject matter of Example 9 optionally includes where the first MAC duration field comprises 15 bits with a first granularity of 1 μs and the TXOP duration field comprises 7 bits with a second granularity of one from the following group: 5 μs, 6 μs, 7 μs, 8 μs, and 9 μs.

In Example 11, the subject matter of any one or more of Examples 1-10 optionally include where the first HE PPDU is one from the following group: a HE single user (SU) PPDU, a HE SU extended range (EXT) PPDU, a HE multiple user (MU) PPDU, or a HE trigger based (TB) PPDU.

In Example 12, the subject matter of Example 11 optionally includes where the TXOP duration field comprises a different number of bits depending on a type of the first HE PPDU.

In Example 13, the subject matter of any one or more of Examples 1-12 optionally include where the first HE PPDU configures a HE station to defer for a duration equal to a duration value indicated by the TXOP duration field if the MAC-layer portion of the first HE PPDU is not decoded by the HE station.

In Example 14, the subject matter of any one or more of Examples 1-13 optionally include where the physical-layer portion of the first HE PPDU is a high-efficiency (HE) signal (SIG) A field (HE-SIG-A).

In Example 15, the subject matter of any one or more of Examples 1-14 optionally include where a duration value indicated by the TXOP duration field is equal to an integer indicated by a first value of the TXOP duration field times a granularity indicated by a second value of the TXOP duration field.

In Example 16, the subject matter of Example 15 optionally includes where a constant is added to the duration value.

In Example 17, the subject matter of Example 16 optionally includes where a value of the constant is indicated by a third value of the TXOP duration and where units of the duration value are microseconds.

In Example 18, the subject matter of any one or more of Examples 1-17 optionally include where the processing circuitry is further configured to: if the first HE PPDU is to include the first MAC duration field in the first MAC-layer portion, set the first MAC duration field value to indicate a duration calculated as a value indicated by the second MAC duration minus a period of time from a first time from an end of the transmission of the second HE PPDU to a second time when the first HE PPDU is to end being transmitted, where the duration indicated by the first MAC duration field value is rounded up or down to an integer.

In Example 19, the subject matter of any one or more of Examples 1-18 optionally include where the wireless device is one from the following group: an Institute of Electrical and Electronic Engineers (IEEE) 802.11ax access point, an IEEE 802.11ax station, an IEEE 802.11 station, and an IEEE 802.11 access point.

In Example 20, the subject matter of any one or more of Examples 1-19 optionally include where the processing circuitry is further configured to: configure the wireless device to transmit the first HE PPDU in accordance with one or both of orthogonal frequency division multiple access (OFDMA) or multiple-user multiple-input multiple-output (MU-MIMO).

In Example 21, the subject matter of any one or more of Examples 1-20 optionally include transceiver circuitry coupled to the processing circuitry; and, one or more antennas coupled to the transceiver circuitry.

Example 22 is a non-transitory computer-readable storage medium that stores instructions for execution by one or more processors, the instructions to configure the one or more processors to cause an apparatus of a wireless device to: encode a first high efficiency (HE) physical-layer convergence procedure (PLCP) protocol data unit (PPDU) including a transmission opportunity (TXOP) duration field in a first physical-layer portion of the first HE PPDU; if the first HE PPDU is to include a first media access control (MAC) duration field in a first MAC-layer portion of the first HE PPDU, set the TXOP duration field value to indicate a largest duration value representable by the TXOP duration field that is equal to or less than a duration value indicated by the first MAC duration field; if the first HE PPDU is not to include the first MAC duration field in the first MAC-layer portion, set the TXOP duration field based on a second MAC duration field of a second MAC-layer portion of a second HE PPDU that solicited the first HE PPDU; and configure the wireless device to transmit the first HE PPDU.

In Example 23, the subject matter of any one or more of Examples 19-22 optionally include where the instructions further configure the one or more processors to cause the apparatus to: if the first HE PPDU is not to include the first MAC duration field in the first MAC-layer portion of the first HE PPDU, set the TXOP duration field value to indicate a largest duration value representable by the TXOP duration field that is less than or equal to a duration value indicated by the second MAC duration field minus a period time from a first time of the end of the transmission of the second HE PPDU to a second time when the first PPDU is to end being transmitted.

Example 24 is a method performed by a wireless device, the method including: encoding a first high efficiency (HE) physical-layer convergence procedure (PLOP) protocol data unit (PPDU) including a transmission opportunity (TXOP) duration field in a first physical-layer portion of the first HE PPDU; if the first HE PPDU is to include a first media access control (MAC) duration field in a first MAC-layer portion of the first HE PPDU, setting the TXOP duration field value to indicate a largest duration value representable by the TXOP duration field that is equal to or less than a duration value indicated by the first MAC duration field; if the first HE PPDU is not to include the first MAC duration field in the first MAC-layer portion, setting the TXOP duration field based on a second MAC duration field of a second MAC-layer portion of a second HE PPDU that solicited the first HE PPDU; and configuring the wireless device to transmit the first HE PPDU.

In Example 25, the subject matter of any one or more of Examples 21-24 optionally include setting the TXOP duration field value to indicate a largest duration value representable by the TXOP duration field that is less than or equal to a duration value indicated by the second MAC duration field minus a period time from a first time of the end of the transmission of the second HE PPDU to a second time when the first PPDU is to end being transmitted, if the first HE PPDU is not to include the first MAC duration field in the first MAC-layer portion of the first HE PPDU.

Example 26 is an apparatus of a wireless device including: memory; and processing circuitry coupled to the memory, the processing circuitry configured to: decode a high efficiency (HE) physical-layer convergence procedure (PLCP) protocol data unit (PPDU) including a transmission opportunity (TXOP) duration field in a physical-layer portion of the HE PPDU; if a media access control (MAC)-layer portion of the HE PPDU is not decoded or the MAC-layer portion does not include a MAC duration field, set one or more network allocation vectors (NAVS) based on the TXOP duration field; and if the MAC-layer portion of the PPDU is decoded and the MAC-layer portion comprises the MAC duration field, set the one or more NAVs based on the MAC duration field, where the TXOP duration field is set to indicate a largest duration value that can be represented by the TXOP duration field that is less than or equal to a duration value indicated by the MAC duration field.

In Example 27, the subject matter of Example 26 optionally includes transceiver circuitry coupled to the processing circuitry; and, one or more antennas coupled to the transceiver circuitry.

Example 28 is an apparatus of a wireless device, the apparatus including: means for encoding a first high efficiency (HE) physical-layer convergence procedure (PLCP) protocol data unit (PPDU) including a transmission opportunity (TXOP) duration field in a first physical-layer portion of the first HE PPDU; if the first HE PPDU is to include a first media access control (MAC) duration field in a first MAC-layer portion of the first HE PPDU, means for setting the TXOP duration field value to indicate a largest duration value representable by the TXOP duration field that is equal to or less than a duration value indicated by the first MAC duration field; if the first HE PPDU is not to include the first MAC duration field in the first MAC-layer portion, means for setting the TXOP duration field based on a second MAC duration field of a second MAC-layer portion of a second HE PPDU that solicited the first HE PPDIJ; and means for configuring the wireless device to transmit the first HE PPDU.

In Example 29, the subject matter of Example 28 optionally includes if the first HE PPDU is not to include the first MAC duration field in the first MAC-layer portion of the first HE PPDU, means for decoding the second HE PPDU, the second HE PPDU including at least the second MAC duration field.

In Example 30, the subject matter of any one or more of Examples 28-29 optionally include if the first HE PPDU is not to include the first MAC duration field in the first MAC-layer portion, means for setting the TXOP duration field value to indicate a largest duration value representable by the TXOP duration field that is less than or equal to a duration value indicated by the second MAC duration field minus a period of time from a first time of the end of the transmission of the second HE PPDU to a second time when the first PPDU is to end being transmitted.

In Example 31, the subject matter of Example 30 optionally includes means for rounding up or down to an integer the largest duration value indicated by the second MAC duration field minus the period time from a first time of the end of the transmission of the second HE PPDU to a second time when the first PPDU is to end being transmitted.

In Example 32, the subject matter of any one or more of Examples 9-31 optionally include where the each of the following group are in units of microseconds: a duration value indicated by the second MAC duration, the duration value indicated by the first MAC duration, and the duration value indicated by the TXOP duration.

In Example 33, the subject matter of any one or more of Examples 28-32 optionally include if the first HE PPDU is to include the first MAC duration field, means for setting the first MAC duration field value to indicate a duration of a remaining time in a current TXOP.

In Example 34, the subject matter of any one or more of Examples 28-33 optionally include where the MAC-layer portion is a physical-layer convergence (PLCP) service data unit (PSDU).

In Example 35, the subject matter of any one or more of Examples 28-34 optionally include where the first HE PPDU is a RE trigger based (TB) PPDU and the second HE PPDU is a trigger frame.

In Example 36, the subject matter of any one or more of Examples 28-35 optionally include where the TXOP duration field comprises fewer bits than the MAC duration field.

In Example 37, the subject matter of Example 36 optionally includes where the first MAC duration field comprises 15 bits with a first granularity of 1 μs and the TXOP duration field comprises 7 bits with a second granularity of one from the following group: 5 μs, 6 μs, 7 μs, 8 μs, and 9 μs.

In Example 38, the subject matter of any one or more of Examples 28-37 optionally include where the first HE PPDU is one from the following group: a HE single user (SU) PPDU, a HE SU extended range (EXT) PPDU, a HE multiple user (MU) PPDU, or a HE trigger based (TB) PPDU.

In Example 39, the subject matter of Example 38 optionally includes where the TXOP duration field comprises a different number of bits depending on a type of the first HE PPDU.

In Example 40, the subject matter of any one or more of Examples 38-39 optionally include where the first HE PPDU configures a HE station to defer for a duration equal to a duration value indicated by the TXOP duration field if the MAC-layer portion of the first HE PPDU is not decoded by the HE station.

In Example 41, the subject matter of any one or more of Examples 38-40 optionally include where the physical-layer portion of the first HE PPDU is a high-efficiency (RE) signal (SIG) A field (HE-SIG-A).

In Example 42, the subject matter of any one or more of Examples 38-41 optionally include where a duration value indicated by the TXOP duration field is equal to an integer indicated by a first value of the TXOP duration field times a granularity indicated by a second value of the TXOP duration field.

In Example 43, the subject matter of Example 42 optionally includes where a constant is added to the duration value.

In Example 44, the subject matter of Example 43 optionally includes where a value of the constant is indicated by a third value of the TXOP duration and where units of the duration value are microseconds.

In Example 45, the subject matter of any one or more of Examples 28-44 optionally include if the first HE PPDU is to include the first MAC duration field in the first MAC-layer portion, means for setting the first MAC duration field value to indicate a duration calculated as a value indicated by the second MAC duration minus a period of time from a first time from an end of the transmission of the second HE PPDU to a second time when the first HE PPDU is to end being transmitted, where the duration indicated by the first MAC duration field value is rounded up or down to an integer.

In Example 46, the subject matter of any one or more of Examples 28-45 optionally include where the wireless device is one from the following group: an Institute of Electrical and Electronic Engineers (IEEE) 802.11ax access point, an IEEE 802.11ax station, an IEEE 802.11 station, and an IEEE 802.11 access point.

Example 47 is a non-transitory computer-readable storage medium that stores instructions for execution by one or more processors, the instructions to configure the one or more processors to cause an apparatus of a wireless device to: decode a high efficiency (HE) physical-layer convergence procedure (PLCP) protocol data unit (PPDU) including a transmission opportunity (TXOP) duration field in a physical-layer portion of the HE PPDU; if a media access control (MAC)-layer portion of the HE PPM is not decoded or the MAC-layer portion does not include a MAC duration field, set one or more network allocation vectors (NAVs) based on the TXOP duration field; and if the MAC-layer portion of the PPDU is decoded and the MAC-layer portion comprises the MAC duration field, set the one or more NAVs based on the MAC duration field, where the TXOP duration field is set to indicate a largest duration value that can be represented by the TXOP duration field that is less than or equal to a duration value indicated by the MAC duration field.

In Example 48, the subject matter of Example 47 optionally includes where the TXOP duration field comprises fewer bits than the MAC duration field.

Example 49 is a method performed by an apparatus of a wireless device, the method including: decoding a high efficiency (HE) physical-layer convergence procedure (PLCP) protocol data unit (PPDU) including a transmission opportunity (TXOP) duration field in a physical-layer portion of the HE PPDU; if a media access control (MAC)-layer portion of the HE PPDU is not decoded or the MAC-layer portion does not include a MAC duration field, setting one or more network allocation vectors (NAVs) based on the TXOP duration field; and if the MAC-layer portion of the PPDU is decoded and the MAC-layer portion comprises the MAC duration field, setting the one or more NAVs based on the MAC duration field, where the TXOP duration field is set to indicate a largest duration value that can be represented by the TXOP duration field that is less than or equal to a duration value indicated by the MAC duration field.

In Example 50, the subject matter of Example 49 optionally includes where the TXOP duration field comprises fewer bits than the MAC duration field.

Example 51 is a apparatus of a wireless device, the apparatus including: means for decoding a high efficiency (HE) physical-layer convergence procedure (PLOP) protocol data unit (PPDU) including a transmission opportunity (TXOP) duration field in a physical-layer portion of the HE PPDU; if a media access control (MAC)-layer portion of the HE PPDU is not decoded or the MAC-layer portion does not include a MAC duration field, means for setting one or more network allocation vectors (NAVs) based on the TXOP duration field; and if the MAC-layer portion of the PPDU is decoded and the MAC-layer portion comprises the MAC duration field, means for setting the one or more NAVs based on the MAC duration field, where the TXOP duration field is set to indicate a largest duration value that can be represented by the TXOP duration field that is less than or equal to a duration value indicated by the MAC duration field.

In Example 52, the subject matter of Example 51 optionally includes where the TXOP duration field comprises fewer bits than the MAC duration field.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) station (STA), the apparatus comprising: memory; and, processing circuitry coupled to the memory, the processing circuitry configured to:
   encode a first high efficiency (HE) physical layer (PHY) protocol data unit (PPDU), the first HE PPDU comprising a first media access control (MAC) portion and a HE preamble portion, the HE preamble portion comprising a transmission opportunity (TXOP) field, wherein the TXOP field is seven (7) bits;
   if the first MAC portion is encoded to include a first duration field indicating a first duration value, set the TXOP field to indicate a largest duration value representable by the TXOP field that is equal to or less than the first duration value, wherein a portion of the first duration field indicates the first duration value is 15 bits;
   if the first MAC portion is not encoded to include the first duration field, set the TXOP field based on a second duration field of a second MAC portion of a second HE PPDU that solicited the first HE PPDU; and
   configure the HE STA to transmit the first HE PPDU.

2. The apparatus of claim 1, wherein the processing circuitry is further configured to:
   set the TXOP field to a value indicating no duration information.

3. The apparatus of claim 1, wherein set the TXOP field based on the second duration field further comprises:
   set the TXOP field to indicate the value of the second duration field minus a time, in microseconds, between an end of the second HE PPDU and an end of the first HE PPDU.

4. The apparatus of claim 3, wherein the processing circuitry is further configured to:
   if the value of the second duration field minus the time, in microseconds, between the end of the second HE PPDU and the end of the first HE PPDU includes a fractional microsecond, then round up the value to a next higher integer.

5. The apparatus of claim 1, wherein the first MAC portion is a physical-layer convergence (PLCP) service data unit (PSDU).

6. The apparatus of claim 1, wherein the first HE PPDU is a HE trigger based (TB) PPDU and the second HE PPDU is a trigger frame.

7. The apparatus of claim 1, wherein the first HE PPDU is one from the following group:
   a HE single user (SU) PPDU, a HE SU extended range (EXT) PPDU, a HE multiple user (MU) PPDU, or a HE trigger based (TB) PPDU.

8. The apparatus of claim 1, wherein the largest duration value indicated by the TXOP field is equal to an integer indicated by a first value of the TXOP field times a granularity indicated by a second value of the TXOP duration field.

9. The apparatus of claim 8, wherein a constant is added or subtracted from the integer.

10. The apparatus of claim 1, wherein the processing circuitry is further configured to:
configure the HE STA to transmit the first HE PPDU in accordance with one or both of orthogonal frequency division multiple access (OFDMA) or multiple-user multiple-input multiple-output (MU-MIMO).

11. The apparatus of claim 1, wherein the processing circuitry is further configured to:
if the first MAC portion is to include the first duration field indicating the first duration value, set the first duration value to indicate a duration of a remaining time in a current TXOP.

12. The apparatus of claim 1, wherein set the TXOP field to indicate the largest duration value representable by the TXOP field further comprises:
if a granularity bit of the TXOP field is not set, set a value of the TXOP field to be the first duration value divided by 8 rounded down to a nearest integer.

13. The apparatus of claim 12, wherein set the TXOP field to indicate the largest duration value representable by the TXOP field further comprises:
if the granularity bit of the TXOP field is set, set the value of the TXOP field to be the first duration value minus a constant divided by 128 rounded down to a nearest integer.

14. The apparatus of claim 1, wherein the HE STA is configured to operate in accordance with at least one from the following group: institute of Electrical and Electronic Engineers (IEEE) 802.11ax and IEEE 802.11.

15. The apparatus of claim 1, further comprising a transceiver coupled to the processing circuitry; and further comprising one or more antennas coupled to the transceiver.

16. A non-transitory computer-readable storage medium that stores instructions for execution by one or more processors of an apparatus of a high-efficiency (HE) station (STA), the instructions to configure the one or more processors to:
encode a first high efficiency (HE) physical layer (PHY) protocol data unit (PPDU), the first HE PPDU comprising a first media access control (MAC) portion and a HE preamble portion, the HE preamble portion comprising a transmission opportunity (TXOP) field, wherein the TXOP field is seven (7) bits;
if the first MAC portion is encoded to include a first duration field indicating a first duration value, set the TXOP field to indicate a largest duration value representable by the TXOP field that is equal to or less than the first duration value, wherein a portion of the first duration field indicating the first duration value is 15 bits;
if the first MAC portion is not encoded to include the first duration field, set the TXOP field based on a second duration field of a second MAC portion of a second HE PPDU that solicited the first HE PPDU; and
configure the HE STA to transmit the first HE PPDU.

17. The non-transitory computer-readable storage medium of claim 16, wherein the instructions further configure the one or more processors to:
set the TXOP field to a value indicating no duration information.

18. A method performed by an apparatus of a high-efficiency (HE) station (STA), the method comprising:
encoding a first high efficiency (HE) physical layer (PHY) protocol data unit (PPDU), the first HE PPDU comprising a first media access control (MAC) portion and a HE preamble portion, the HE preamble portion comprising a transmission opportunity (TXOP) field, wherein the TXOP field is seven (7) bits;
if the first MAC portion is encoded to include a first duration field indicating a first duration value, setting the TXOP field to indicate a largest duration value representable by the TXOP field that is equal to or less than the first duration value, wherein a portion of the first duration field indicating the first duration value is 15 bits;
if the first MAC portion is not encoded to include the first duration field, setting the TXOP field based on a second duration field of a second MAC portion of a second HE PPDU that solicited the first HE PPDU; and
configure the HE STA to transmit the first HE PPDU.

19. The method of claim 18, wherein the method further comprises:
setting the TXOP field to a value indicating no duration information.

* * * * *